United States Patent [19]

Newman

[11] Patent Number: 4,584,676
[45] Date of Patent: Apr. 22, 1986

[54] METHOD OF AND APPARATUS FOR PIPE LENGTH MEASUREMENT

[75] Inventor: John W. Newman, Wayne, Pa.
[73] Assignee: Measurement Systems, Inc., Norristown, Pa.
[21] Appl. No.: 358,290
[22] Filed: Mar. 15, 1982
[51] Int. Cl.$^4$ .............................................. G01S 15/14
[52] U.S. Cl. ...................................... 367/108; 367/98; 367/902; 367/910; 73/597
[58] Field of Search ...................... 367/96, 97, 98, 99, 367/108, 908, 910; 181/400; 138/90, 104; 73/597, 598, 644, 661

[56] References Cited

U.S. PATENT DOCUMENTS

| | | | |
|---|---|---|---|
| 2,534,830 | 12/1950 | Philo | 138/90 X |
| 4,192,177 | 3/1980 | Crickard et al. | 138/90 X |
| 4,241,430 | 12/1980 | Kayem et al. | 367/910 X |

Primary Examiner—Richard A. Farley
Attorney, Agent, or Firm—John F. A. Earley

[57] ABSTRACT

An improved method and apparatus for measuring the length of an open pipe includes a sound transducer placed in spaced open air communication with the interior of the pipe at a selected end. A logic circuit is employed with the transducer for producing a square wave sound pulse that is directed at the pipe's selected end. An oscillator provides an ambient temperature modified count in accordance with the time required for the pulse to travel the length of the pipe and return. For compensating for error tending to be introduced because of the spacing of the impedance reflective surface at the far end of the pipe, a standoff device establishes such a distance between the transducer and the selected end of the pipe as to effect an adjustment in the duration of the oscillator count that corrects for the error. In another embodiment a microprocessor is employed with the transducer to produce two successive square wave sound pulses to effect an adjustment in the count of an oscillator clock to avoid a false reading due to the above-mentioned spacing of the reflective surface. The amplitude of the greatest peak of the first pulse is measured. The gain of an amplifier is then adjusted to make a timer stop, modified in accordance with ambient temperature, during the reception of the echo from the second pulse when 40% of the amplitude of the peak echo is obtained.

34 Claims, 31 Drawing Figures

METHOD OF AND APPARATUS FOR PIPE LENGTH MEASUREMENT

BACKGROUND OF THE INVENTION

1. Field of the Invention

The present invention relates to an improved method of and apparatus for accurately measuring and indicating and/or recording the individual and cumulative lengths of open-ended tubes such as drill pipes and providing a signal for inventory control.

2. Description of the Prior Art

It has long been known in the prior art that acoustical or sound waves move in bounded media and that when boundaries are encountered reflection occurs. Evidence of the reflection of sound waves from a wall or barrier is the echo that is heard.

Reflection of sound waves also occurs when sound passing down a tube or pipe meets an abrupt change in area. This penomena has been the subject of much investigation and has been employed for many purposes including the determination of the location of openings and obstructions in tubes and the measurement of the lengths of pipes.

The historical background relating to the study of sound indicates that velocity in the air was the earliest acoustical quantity to be measured. In 1862, Regnault measured the velocity of sound in pipes for various conditions of temperature and humidity. See "ACOUSTICS," Alexander Wood, Blackie and Son Limited, London (1940), page 250.

In 1896, Lord Rayleigh calculated the correction in the length of an open pipe due to the effective or impedance reflective surface being spaced away from the end of the pipe. The correction was calculated to be 0.82 times the radius of the pipe for a pipe ending with an infinite flange. Experimentally, he found the end correction of an unflanged open pipe to be 0.6 multiplied by the pipe radius. See "The Theory of Sound" by Rayleigh, Dover Publications, New York (1896), page 487.

Helmholtz, in 1897, determined the correction in the length of an open pipe required to compensate for radiation loss and impedance change for a pipe without a flange at being 0.6 R, R being the pipe internal diameter divided by two. Helmholtz also determined the intensity of a reflected acoustic wave where a change in the pipe internal diameter occurs. See "TECHNICAL ASPECTS OF SOUND," edited by E. G. Richardson, Elsevier Publishing Company, New York (1953), pages 493 et seq.

A mathematical explanation of the reflection that occurs when sound passing down a tube meets an abrupt change in area is given on pages 9-38, 9-39, 9-44 and 9-45 in the HANDBOOK OF ENGINEERING FUNDAMENTALS comprising Volume 1 of the Wiley Engineering Handbook Series, published in 1936, under the Editorship of Ovid W. Eshbach by John Wiley & Sons, Inc., New York.

In 1962, Louden presented a paper at the FOURTH INTERNATIONAL CONGRESS ON ACOUSTICS in Copenhagen on a new method for determining the end correction of pipes by means of pulses. Until that time such measurements of the velocity of sound had been made using a continuous wave to excite a tube into resonance. Louden showed the relationship between "a", the correction factor, and the diameter to be about 0.65 for an open pipe without a flange.

Summarizing the foregoing with respect to the utilization of sound in determining the length of pipes, it has been known in the prior art that:

1. In an open pipe, a sound pulse with a wave length greater than the pipe internal diameter will propagate the length of the pipe and reflect from the open end the pipe.

2. The reflection occurs not at the exact end of the pipe but at a distance of 0.65 R beyond the end where R is the pipe radius. The spacing of the impedance reflective surface from the end of the pipe is thus a function of internal pipe diameter.

3. The velocity of sound in all but small pipes is that for sound in open air for a given temperature and humidity.

It has been proposed in the prior art, in U.S. Pat. No. 4,241,430, granted on Dec. 23, 1980 to D. J. Kayem et al, to determine the individual and cumulative length of numerous "joints" or lengths of drill pipe or casing by the use of a hand-held probe and a separate housing that is in electrical communication with the probe by a conduit or cable. The probe includes a switch, means to measure the ambient temperature, means to produce sound pulses, and means to detect acoustic waves created by reflected sound pulses. Provided for use with the probe are flanged tubes having the same length but different sizes of flanges, termed "coupling means," for placing the probe into closed communication with the interior of the pipe, and for taking into account different pipe diameters. The housing contains the remainder of the required components and electrical circuitry of the apparatus, including a battery for power, that are provided for making the pipe length determination by solving a mathematical equation.

A problem with the method and apparatus of the Kayem et al patent is a requirement for the probe to be placed in closed communication with the interior of the pipe. Additionally, the mathematical equation to be solved and the required electrical circuitry are undesirably complex since correction or compensation is required not only for the distance that the impedance reflective surface is spaced from the end of the pipe but also for the distance that the impedance reflective surface is spaced from the hand-held probe, and in particular, the means for producing sound and the means for detecting reflected acoustic waves. A further problem with an alternate method contemplated in the patent is the requirement for the operator, when making pipe length measurements, to manually insert into the computer, in each case, the diameter of the pipe being measured in order to effect compensation for the impedance reflective surface being spaced from the end of the pipe. Another alternative method and apparatus disclosed in the patent utilizes flanged tubes or coupling means having tubes of different length for taking into account the different pipe diameters. In each of the forms of apparatus that are disclosed, the requirement for a housing separate from the probe seriously detracts from the portability, and hence, the utility of the apparatus, as does also the need for the use of different flanged tubes.

SUMMARY OF THE INVENTION

An object of the invention is to provide for use in the measurement of the length of open pipe an improved acoustical method and apparatus for compensating for the impedance reflective surface being spaced from the end of the pipe.

Another object of the invention is to provide such an improved method and apparatus in which compensation is not required for the distance the transducer (sound generator and receiver) is spaced from the impedance reflective surface.

A further object of the invention is to provide such an improved method and apparatus in which the transducer may be in spaced open air communication with the interior of the pipe at the selected end from which the pipe length measurement is made.

Still another object of the invention is to provide for such pipe length measurement a light-weight acoustical hand-held probe that contains not only the transducer but also all of the required electrical, display and power components.

A further object of the invention is to provide a standoff frame that may be permanently attached to the probe to allow the use of simplified circuitry in making the pipe length measurements.

Another and more specific object of the invention is to provide for use with the standoff frame a small tube that may be welded thereto that isolates the return echo from the pipe under measurement from the echoes from other pipes in a stack, such small tube being advantageous for use in the measurement of the lengths of small diameter pipes.

A further specific object of the invention is to provide an array of transducers that may be removably secured to the probe for making measurements of the lengths of very large diameter pipes.

In accomplishing these and other objectives of the invention, there is provided a hand-held probe that contains the electrical circuitry and components including a sound transducer and a battery for providing electrical power, and on which a pistol trigger switch and a display device are mounted.

In a first embodiment of the invention, a logic circuit which may be of the CMOS, TTL or MOS type is employed in conjunction with the transducer for producing a square wave sound pulse that is directed at the end of the pipe the length of which is to be measured, closed communication with the pipe not being required, and for detecting the echo from the far end of the pipe. An oscillator provides a count in accordance with the time required for the generated pulse to traverse the length of the pipe and to return, the count being modified in accordance with the ambient temperature. The total count is displayed to provide a measurement of the pipe length.

For compensating for the impedance reflective surface being spaced from the far end of the pipe, there may be provided a probe coupling mechanical means or standoff device for establishing a distance between the probe, and hence, the transducer, and the near end of the pipe that varies in accordance with the internal diameter of the pipe under measurement. This effects an adjustment in the duration of the oscillator count that corrects for an error in pipe length measurement tending to be caused by the spacing of the impedance reflective surface being spaced from the end of the pipe.

The standoff device comprises a triangular wire frame that may be permanently and securely attached to the end of the probe and operates to space the transducer from the near end of the pipe by a distance equal to $P = 0.625\ R$ but covering a possible range of $P = (0.5-0.85)R$ where $R$ is the pipe radius.

A triangular wire frame with a one inch internal diameter tube welded inside may be provided to conduct return echoes from the far end of the pipe back to the transducer. Such a small tube is advantageous when measuring the lengths of small diameter pipes that are arranged in stacks to avoid error that could result from reflection from adjacent pipes, the small tube thus serving an isolating purpose.

In a second embodiment according to the invention, the circuitry contained in the hand-held probe includes a microprocessor thereby enabling greater flexibility in the method of pipe length measurement and also utilization of the measurements that are made. Specifically, in this embodiment two square wave sound pulses, each having substantially the same amplitude, are employed in order to avoid a false reading of pipe length due to the impedance reflective circuit being spaced from the end of the pipe.

In accordance with this invention embodiment, the amplitude of the greatest peak echo of the first reflected pulse from the far end of the pipe is sensed and measured. The gain of the receiver amplifier is then adjusted to make a timer stop during the reception of the echo from the second pulse when 40% of the amplitude of the peak echo of the first pulse is obtained, the device being compensated for air temperature variations. It has been found that debris in the pipe will produce echo returns of about 5–25% of the echo from the end of the pipe.

The transmitted pulses have a duration of from 0.0003 to 0.0012 seconds, the frequency being tuned to a maximum conduction in the pipe. As a result, the probe may be directed at the end of the pipe up to four times the diameter of the pipe away, and at an angle to the pipe. No acoustic coupling to the pipe to place the probe in closed communication with the pipe interior is required.

For avoiding response to debris in the pipe and compensating for the error that such debris tends to cause, a standoff wire frame as described above in connection with the first embodiment of the invention may be employed. The optimum characteristic shape of such standoff device for use in the second embodiment of the invention may be determined experimentally.

Also, in accordance with both embodiments of the invention, the hand-held probe may be utilized to place into memory the measured length of each pipe for inventory control. This length may be associated with an operator-set, measured internal diameter for the tubes. The probe may include a display of individual and cumulative pipe lengths. Additionally, the memory may be used to present the serial data to a larger computer.

For measuring the lengths of larger diameter pipe, an array of transducers may be associated with the probe to produce a low frequency plane wave, and hence, an echo return.

BRIEF DESCRIPTION OF THE DRAWINGS

FIGS. 23A-1, 23A-2 and 23A-3 illustrate the left half and FIGS. 23B-1, 23B-2 and 23B-3 illustrate the right half of a detailed schematic diagram of the circuitry of FIG. 19 wherein a microprocessor is employed;

DESCRIPTION OF THE PREFERRED EMBODIMENTS

Figure 1:
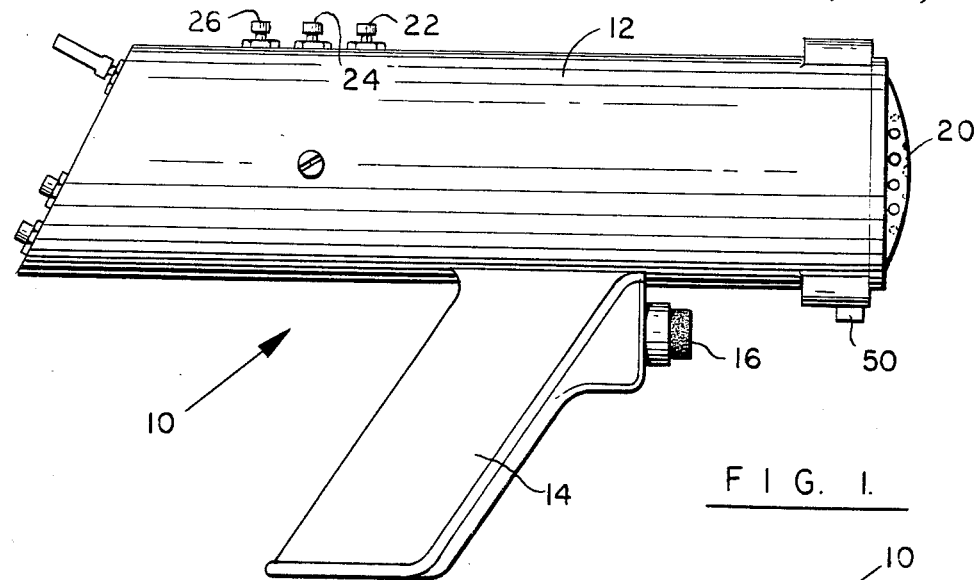
FIG. 1 is a side elevational view of a hand-held probe comprising a preferred embodiment of the invention.
Figure 2:
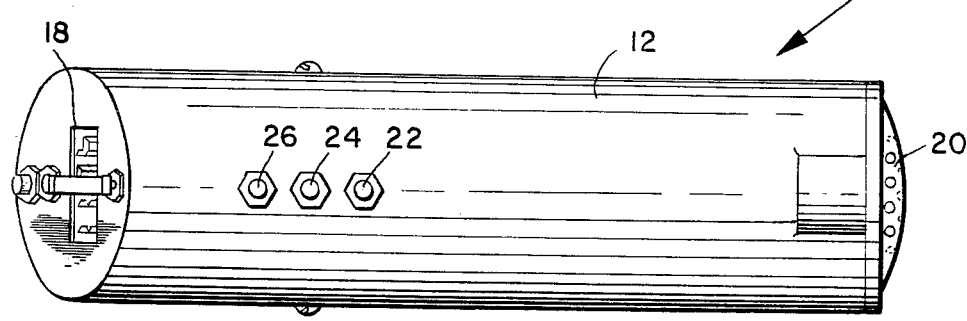
FIG. 2 is a top view of the probe of FIG. 1.
Figure 3:
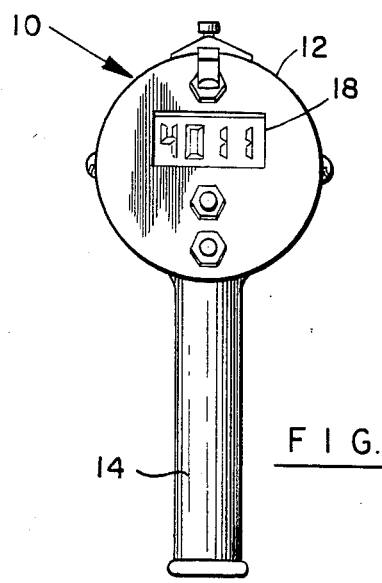
FIG. 3 is a rear elevational view of the probe of FIG. 1.
Figure 4:
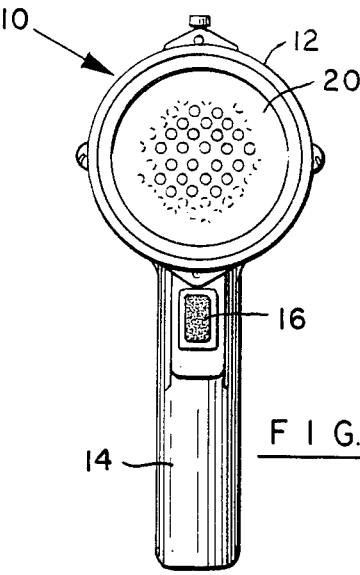
FIG. 4 is a front elevational view of the probe of FIG. 1.

In FIG. 1 there is illustrated a preferred embodiment of a self-contained hand-held probe according to the invention. The probe, indicated generally by the reference numeral 10, includes a cylindrical housing 12 and a pistolgrip handle 14 on which a push button switch 16 is provided. Mounted on the rear of the housing, as shown in FIGS. 2 and 3 is a display unit 18. A plastic screen or grille 20, as shown in FIGS. 1 and 4, is provided at the front of the housing 12.

The housing 12 contains the electrical circuitry and components required for the probe 10 including a suitable battery such as a 7.2 volt Nicad battery for providing a source of electrical power. The display device 18 may be of the liquid crystal or light emitting diode type providing a digital readout. The push botton switch 16 is provided for initiating a pipe length measurement.

Three push-button switches 22, 24 and 26 are provided at the top of the housing 12, toward the rear thereof, as seen in FIGS. 1 and 2. These switches 22, 24 and 26, as described hereinafter, may be employed to enable selection of the desired units of pipe length, that is, in feet or meters, for example, and other desired operations such as "display to memory tally" and "clear memory."

Figure 5:
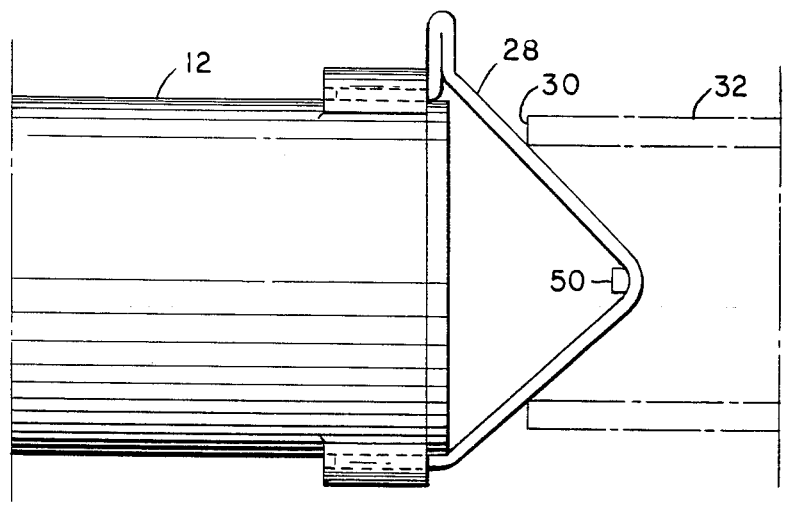
FIG. 5 is a fragmented side elevvational view illustrating an embodiment of the invention employing a stanoff wire frame attached to the front end of the frame.
Figure 6:
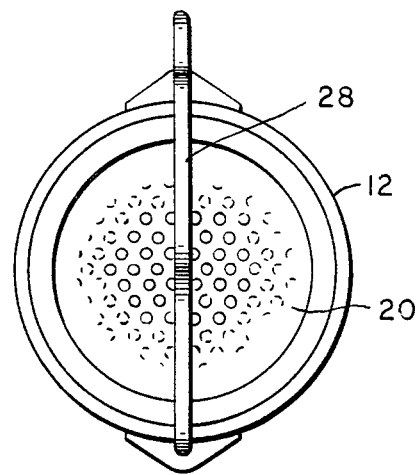
FIG. 6 is a front view of the probe of FIG. 5.
Figure 7:
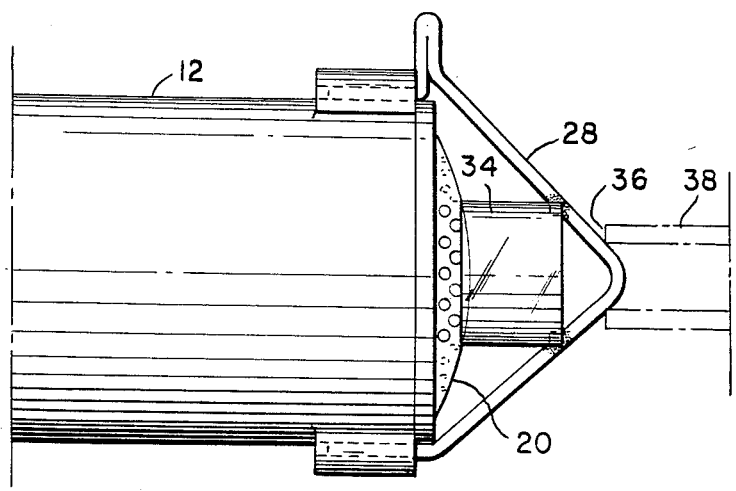
FIG. 7 is a side elevational view illustrating an embodiment of the invention employing a short small tube that is useful particularly in measuring the lengths of pipes of small diameter.
Figure 8:
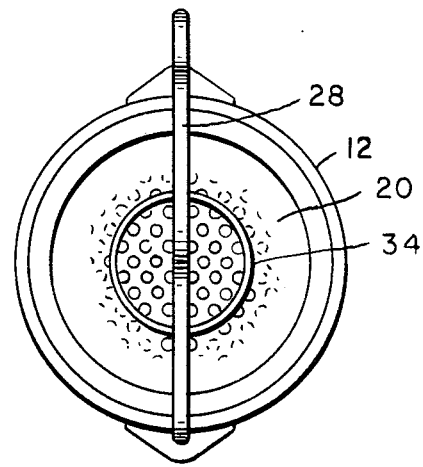
FIG. 8 is a front view of the probe embodiment of FIG. 7.

For compensating for the impedance reflective surface at the far end of a pipe under measurement being spaced from the end of a pipe, there is illustrated in FIGS. 5 and 6 a standoff wire frame 28 for establishing a distance between the probe 10 and the near or selected end 30 of a pipe 32 under measurement that varies in accordance with the pipe internal diameter, the pipe 32 being shown in phantom in FIG. 5. In FIGS. 7 and 8 there is illustrated a modification of the standoff wire frame 28 that includes a small cylindrical tube 34 that may be of metal and the purpose of which is explained hereinafter. In FIG. 7 the frame 28 and tube 34 are shown associated with the selected end 36 of a pipe 38, shown in phantom. that has a smaller diameter than that of the pipe 32 of FIG. 5.

Figure 9:
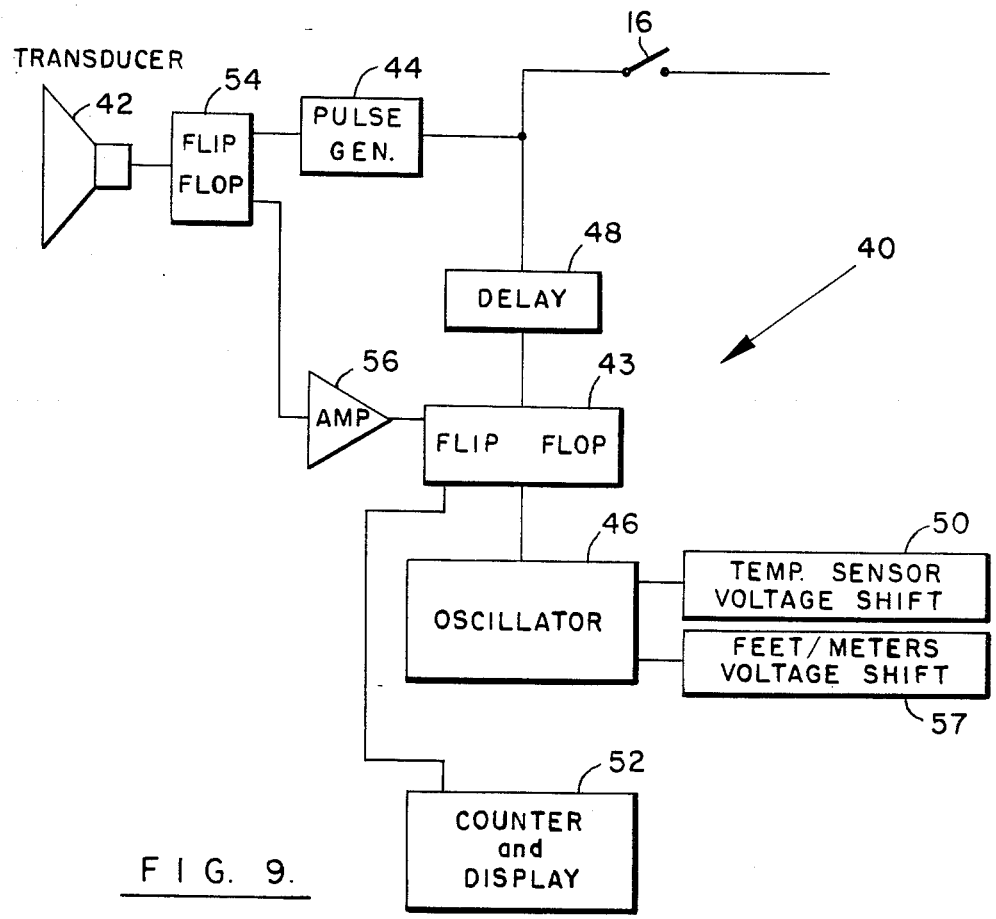
FIG. 9 is a block diagram of a simplified circuit employed in a first embodiment of the invention.
Figure 10:
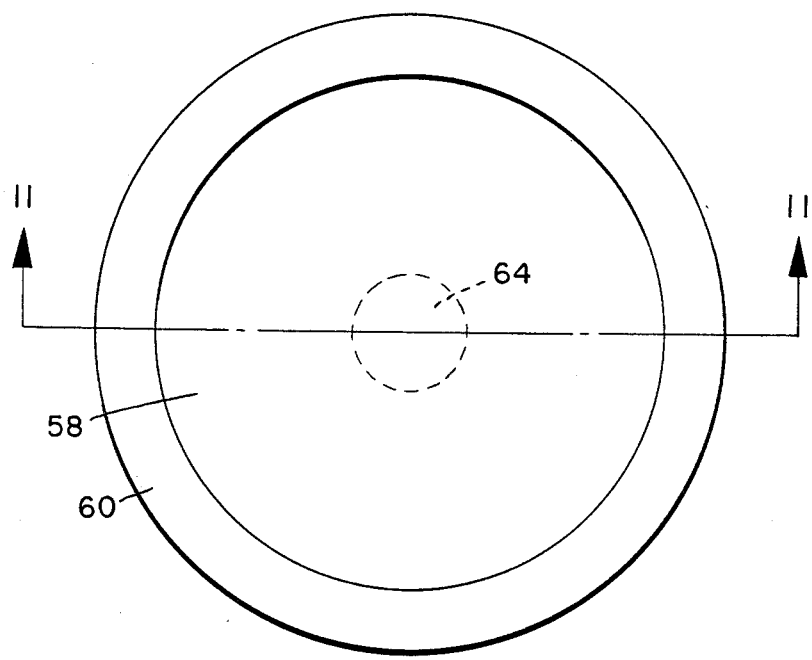
FIG. 10 is a front view of a preferred transducer for use with the invention.
Figure 11:
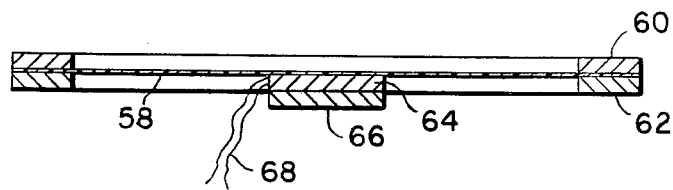
FIG. 11 is a cross sectional view of the transducer of FIG. 10 taken along the lines 11—11.

In one embodiment of the invention, the electrical circuitry contained within the housing 12 comprises a logic circuit indicated at 40 in FIG. 9. The logic circuit 40 includes a transducer 42 that is operative to produce square wave sound pulses and also to detect the echo return from the far end of a pipe the length of which is under measurement. The transducer 42 preferably is of the piezoelectric or crystal type. A preferred form of transducer 42 is illustrated in FIGS. 10 and 11 described hereinafter.

Logic circuit 40, which may be of the CMOS, TTL or MOS type, includes the pistol grip push button switch 16, a flip flop 43, a square wave pulse generator 44, an oscillator 46, a delay unit 48, an ambient temperature compensating sensor 50, a counting and display device 52, a flip flop 54, an amplifier 56 and a feet/meter voltage shift 57.

In the operation of the logic curcuit 40, closing the switch 16 fires the pulse generator 44 and starts the oscillator 46 after a delay, effected by delay unit 48, of 0.0003 seconds. The pulse produced is a square wave preferably having a duration of from 0.0003 to 0.0012 seconds for pipes having internal diameters from one-half inch ($\frac{1}{2}''$; 1.27 cm.) to six inches ($''$; 15.24 cm.), and 0.001 to 0.010 seconds for pipes six inches (6"; 15.24 cm) and above.

Oscillator 46 oscillates at a frequency "f" such that for a four digit display by device 52, in feet, of the length of a pipe under measurement, the following relation exists:

$$f = V(9999)/199.98 = 56{,}450 \text{ Hz at } 68°\text{ F. and } 70\% \text{ humidity;}$$

where

V = speed of sound in feet (or other units) at a given temperature (1128 feet at 68° F.);

9999 = total count of oscillator 46 in one second; and 199.98=2×99.99 feet where 99.99 feet is the chosen maximum distance to be measured.

Flip flop 54 is set to conduct the pulse generated by the generator 44 whereby the generated pulse drives the transducer 42. The transducer 42 converts the square wave electrical pulse into an acoustical plane wave that is radiated into the open air and into the selected end of the pipe being measured. At the far end of the pipe the acoustical plane wave transmitted by transducer 42 is reflected from the impedance reflective surface, that surface being spaced a distance approximately 0.6 R beyond the end of the pipe, where R is the inside radius of the pipe for pipe sizes up to eight inches (8"; 20.32 cm.).

Flip flop 54 switches to allow disabling of the oscillator 46 immediately after the transducer 42 stops ringing, as effected by flip flop 43. This is after a fixed time of about 0.0002 seconds. The reflected acoustic pulse is then sensed by transducer 42 and passed through the flip flop 54 to the amplifier 56 and thereby to the oscillator 46, disabling the latter and stopping the count. The total pulse count of oscillator 46 is displayed by display device 52. If desired, a hard copy of the total count may be provided by a printing unit. The total count may also be entered directly into a computer, into a memory module for a tally count, that is, a count of the total length in feet, for example, of a bundle of pipes, or for a measure of the individual pipe.

The temperature compensating sensor 50 may be mounted internally of the housing 12 of probe 10, or preferably externally of the housing 12, as shown in FIG. 1. Another alternative location is illustrated in FIG. 5 wherein the sensor 50 is shown mounted on the inner side of the bend of the wire standoff frame 28. Accordingly, sensor 50 is in a position to sense and to respond to changes in the air temperature adjacent the near or selected end of each pipe under measurement. Sensor 50 may be a resistor which changes in value with variation in temperature and is associated with a resistancecapacitance (RC) circuit in the oscillator 46 to change the frequency of oscillation thereof as required to compensate for changes in the speed of sound due to changes in air temperature.

The transducer 42 desirably is mounted internally of the housing 12, immediately behind the grille 20, and may be of the well-known commercially available "dynamic" or "magnetic types" that utilize a moving coil and have a coneshaped diaphragm for converting electrical energy into acoustical signal energy. When such a transducer 42 is employed, a separate microphone, also of known type and available commercially, is required for converting incident acoustical energy into electrical energy.

Advantageously, however, a transducer 42 of the piezoelectric or crystal type may be employed in each of the embodiments of the present invention. This is for the reason that with a transducer 42 of this type a single diaphragm including an attached piezoelectric element is operable to provide a dual function of generating and detecting acoustical waves. Piezoelectric transducers having a cone-shaped diaphragm are commercially available.

It is preferred, in accordance with the present invention, to employ a piezoelectric transducer 42 having a flat diaphragm since a flat diaphragm is best for generating and detecting plane acoustical waves. The use of plane acoustical waves has been found to be advantageous in making pipe length measurements. Such a preferred form of piezoelectric transducer 42 is illustrated in FIGS. 10 and 11.

Transducer 42, as shown in FIGS. 10 and 11, includes a flat diaphragm 58 formed of material known in the art to be suitable for the purpose, for example, a thin metallic or plastic material. Diaphragm 58 is captured between mounting rings 60 and 62 which, in addition to providing support for the diaphragm 58, also serve as a baffle. Attached to the diaphragm 58, at the center thereof, is a piezoelectric element 64. A reaction mass 66, in turn, is attached to the piezoelectric element 64. The means of attachment, in each case may be by a suitable bonding method, as known in the art. Alternatively, the mounting ring could support a frame to which the piezoelectric crystal is bonded in addition to the diaphragm 58, thus enabling elimination of the reaction mass 66. Electrical conducting leads indicated at 68 extend from the element 64.

The thickness of diaphragm 58 may be in the range from 0.0005 to 0.005 inches (0.00127 to 0.0127 cm.) and 1 to 10 inches (2.54 to 25.4 cm.) in diameter, the diameter being selected to be in accord with the diameter of housing 12. Piezoelectric element 64 may be a model 70140 manufactured by Linden Laboratories, Inc., State College, Pa. The reaction mass 66 may comprise a mass of 0.09 to 10 grams.

In the operation of the transducer 42 of FIGS. 10 and 11, electrical pulses from the pulse generator 44 that are applied to the piezoelectric element 64 cause the latter to undergo dimensional changes due to piezoelectric action thereby to cause the diaphragm 58 to vibrate to produce acoustical waves. Conversely, pressure impingement of acoustical waves on the diaphragm 58 causes the latter to vibrate and thereby effect dimensional changes in the piezoelectric element 64 that generate electrical signals therein.

Figure 12:
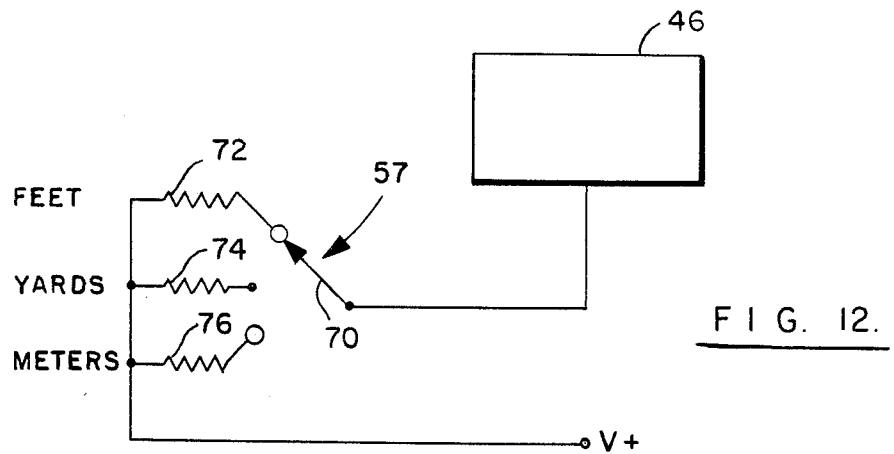
FIG. 12 illustrates a modification of the circuitry of FIG. 9 for selecting the desired units of measurement.

In order to permit the digital reading on the display device 52 to be in feet, meters, yards or other units of measurement, there may be utilized, as illustrated in FIG. 12, the feet/meter voltage shift device 57 which includes a switch 70 for changing the units of the readout of the counting and display device 52. Associated with switch 70 are fixed resistors 72, 74 and 76, each having a different value. One end of each of resistors 72, 74 and 76 is connected to the positive terminal, V+, of the power supply. The other terminal of each resistor 72, 74 and 76 is selectively connected by switch 70 to an RC circuit in the oscillator clock 46 for adjusting the frequency of oscillation as required to produce the desired result, that is, a display by device 52 in feet, meters, etc., as selected by manipulation of switch 70.

Figure 13:
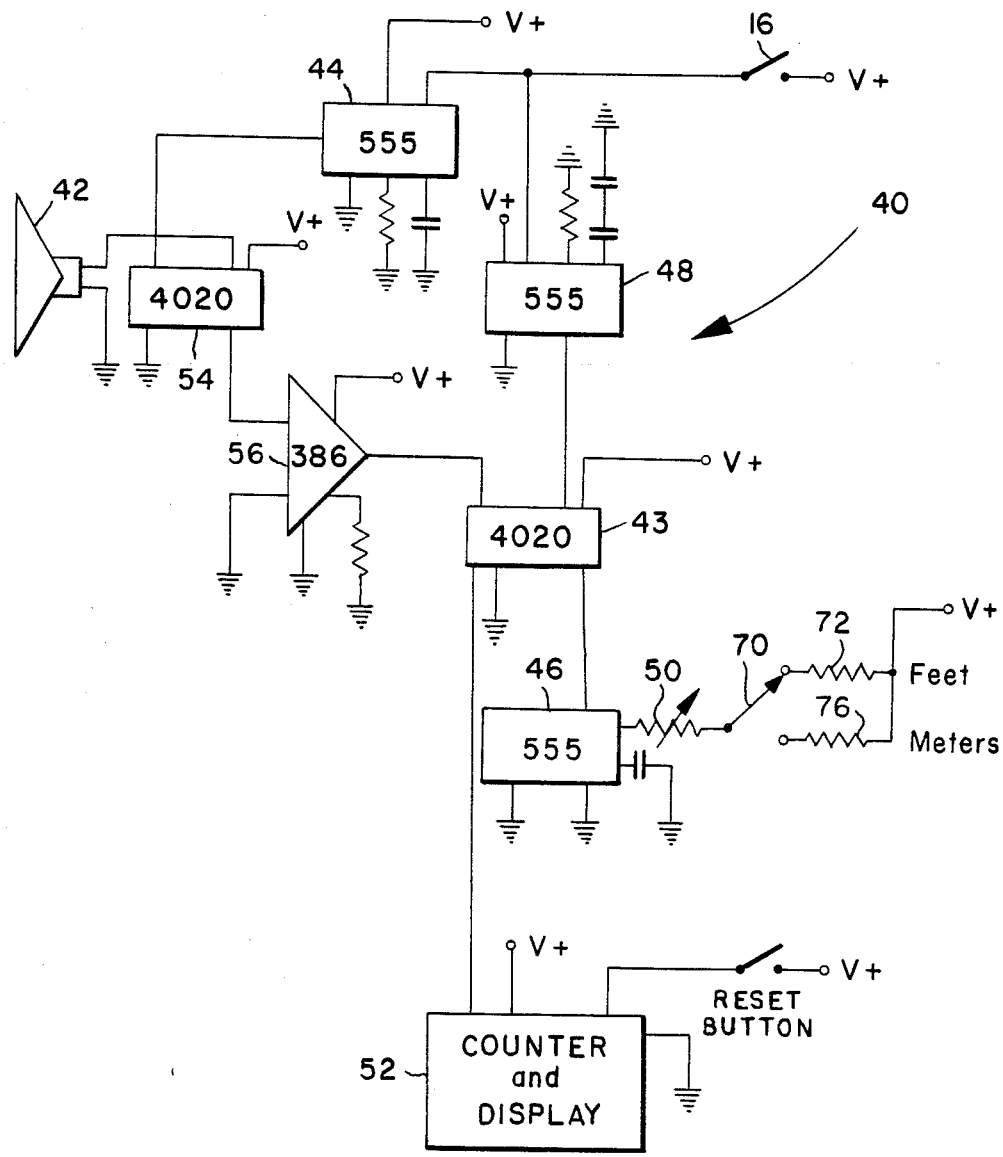
FIG. 13 is a detailed schematic diagram of the circuitry of FIG. 9 wherein CMOS technology is utilized.

In the detailed schematic diagram of FIG. 13 the various components comprising the circuitry are shown to be of commercially available types, such as those manufactured by Motorola, National Semiconductor, Hitachi, etc., or equivalent. Thus, the pulse generator 44 is seen to comprise a 555 timer chip including required resistor and capacitor connections to ground as known to those skilled in the art. The flip flops 43 and 54 are 4020 flip flops. The oscillator 46 comprises a 555 timer chip with electrical power connections thereto as well as the connections of the temperature compensating sensor 50 and the feet/meter resistors of the voltage shift 57. The counting and display device 52 may comprise an electronic counter such as Model L04.22-H12-D-1-A being sold commercially by Kessler-Ellis, Atlantic Highlands, N.J. The delay timer 48 is a type 555 timer. The amplifier 56 is a 386 amplifier.

Figure 14:
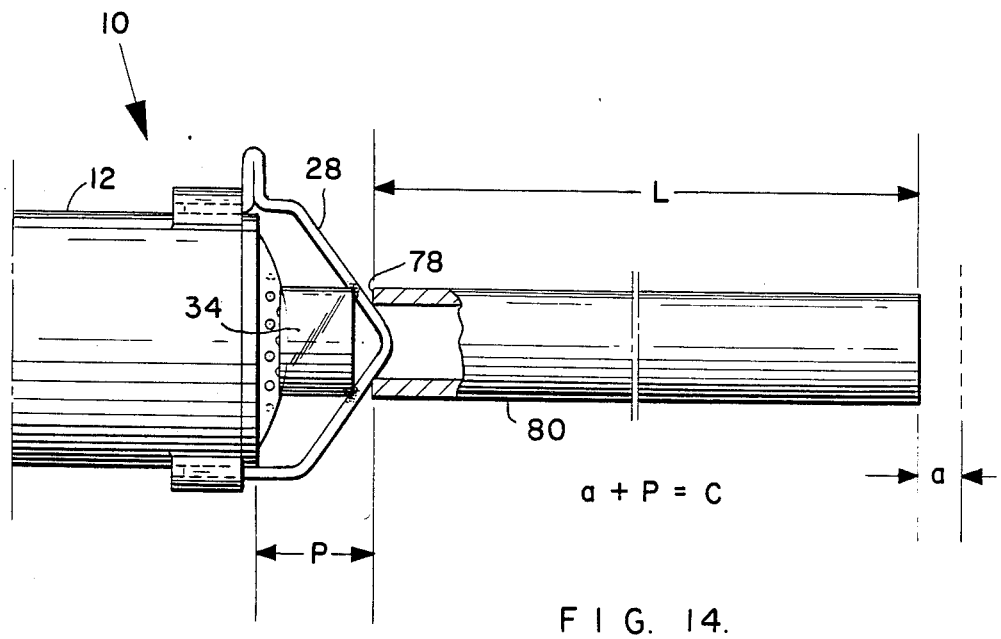
FIG. 14 is a side elevational view illustrating for a small pipe under measurement the manner in which the standoff frame of FIG. 7 establishes a distance between the probe, and hence, the transducer, and the near end of a pipe in accordance with the internal pipe diameter.
Figure 15:
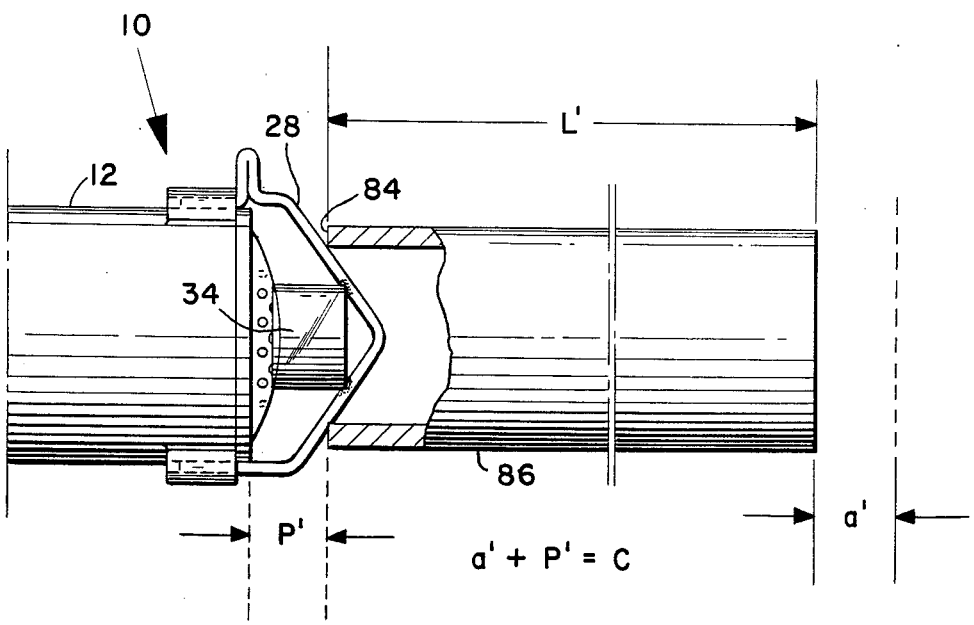
FIG. 15 is a view similar to that of FIG. 14 illustrating the use of the standoff frame of FIG. 7 with a pipe of larger diameter.

For compensating for the impedance reflective surface at the far end of the pipe being spaced beyond the end of the pipe, there is illustrated in FIGS. 14 and 15 the probe 10 and associated standoff frame 28 for establishing a distance between the probe 10 and the near or selected end of a pipe, the length of which is to be measured, that varies in accordance with the internal pipe diameter.

As shown in FIG. 14, the standoff frame 28 automatically establishes a distance, designated "P", between the selected end 78 of a relatively small diameter pipe 80 and the probe 10. The distance from the far end 82 of the pipe to the impedance reflective surface has been designated "a." The angle of the triangular wire frame is such that the sum of "a" and "P" is a constant that, for convenience, is designated "C".

As shown in FIG. 15, the standoff frame 28 establishes a distance designated "'P'" between the selected end 84 of a larger diameter pipe 86 and the probe 10, the distance from the far end of the pipe 86 to the impedance reflective surface being designated "a'." The angle at the bend or apex of the standoff device 28 is such that, again, the sum of "P'"and "a'" is equal to the constant "C".

By subtracting the constant "C" from the total count of the oscillator 46, compensation may be effected for the impedance reflective surface being spaced beyond the far end of the pipe. In accordance with the invention, this is accomplished by delaying the start of the oscillator 46 of the circuit of FIGS. 9 and 13 by 2C/V seconds where V is the speed of sound, as by the use of the delay unit 48. Delay unit 48 is so selected as to provide a delay of this magnitude. There is thus effected an adjustment in the duration of the count of the oscillator clock 46 to compensate or correct for the error in the pipe length measurement due to the impedance reflective surface being spaced from the end of the pipe. Inasmuch as that spacing is a function of the internal pipe diameter, the adjustment in the duration of the count of the oscillator 46 is in accordance with the internal pipe diameter.

Figure 16:
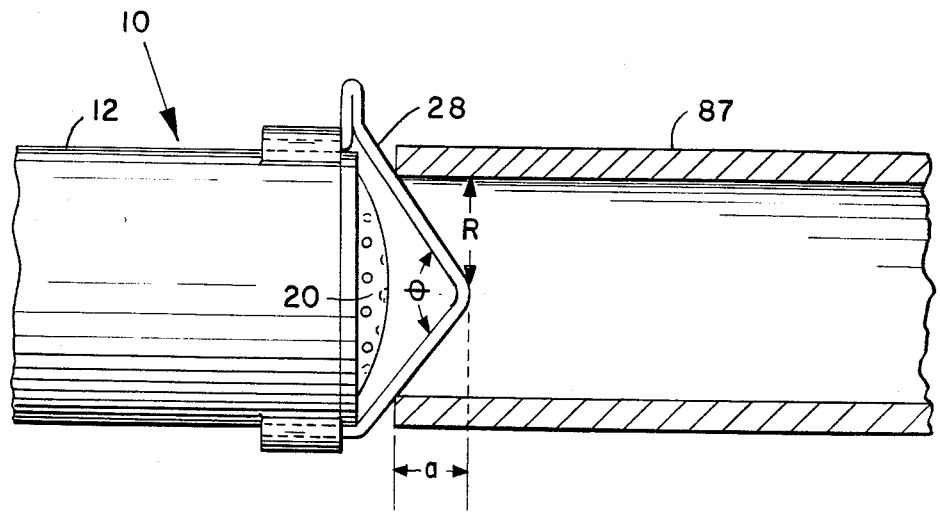
FIG. 16 is a fragmented view in side elevation with a portion in cross section that is provided for analyzing the optimal angle and range of variation thereof for the standoff wire frame illustrated in FIGS. 5, 7, 14 and 15.

An analysis of the optimal angle and range of variation thereof for the angle at the bend or apex of the standoff wire frame 28 is provided by reference to FIG. 16. It is known in the literature, as mentioned hereinbefore, that the correction factor or end correction "a" for an open pipe is about 0.65 R where R is the internal pipe radius. From the geneometry of FIG. 16 where 10 designates the probe, 12 the probe housing, 28 the standoff frame, and 87 a pipe the length of which is to be measured, it is evident that when a=0.65 R, the angle $\theta$ may be expressed as follows:

$$\theta = 2 \arctan \frac{R}{a} = 2 \arctan \frac{1}{0.65}$$
$$= 2 (57°)$$
$$= 114°$$

Experimentation indicates that the correction factor "$\alpha$" can vary for given geometries of probe housing 12 over a range of:

$$\alpha = (0.4 \text{ to } 0.9)R,$$

from which it can be seen that $\theta$ may vary over a range from 96° to 136°.

Figure 17:
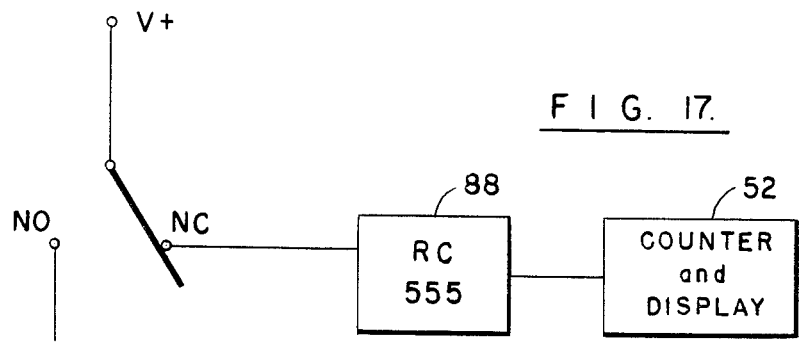
FIGS. 17 and 18 illustrate modifications of the circuitry of FIG. 10 for effecting pipe diameter compensation.

Alternatively, for effecting compensation for the diameter of a pipe under measurement, there may also be provided, as illustrated in FIG. 17, an RC555 Motorola timer chip indicated at 88 between the normally closed terminal NC of the switch 16 and the counter 52 of the detailed schematic circuit of FIG. 13. Timer 88 cycles between the NC terminal and the counter and display 52 to delay the input to the counter. A pulse-in transistor in chip 88 switches on after a delay period.

Figure 18:
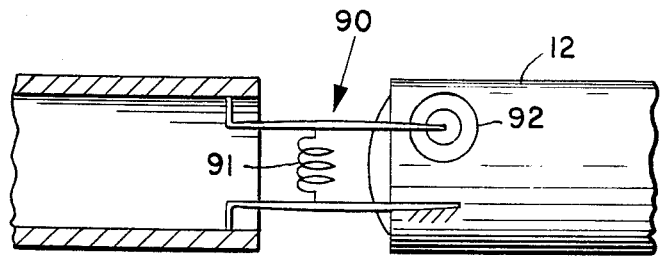

FIG. 18 illustrates another arrangement comprising an operator adjusted potentiameter with exponential diameter calibration for effecting pipe diameter compensation. Specifically, there is provided a spring loaded inside caliper 90 having a compression spring 91 that is tied to a potentiometer 92. the potentiometer 92 being connected to an RC circuit in the counter and display 52 of FIG. 13 to automatically set the diameter. Desirably, one of the position sensing arms of the caliper 90 may be connected to the housing 12 so as to extend forward of the grille 20, as illustrated in FIG. 18.

Another and preferred embodiment of the present invention is illustrated in FIGS. 19-23. The method according to this embodiment employs two successive sound pulses each having substantially the same amplitude, in order to avoid a false reading of the length of the pipe due to the impedance reflective surface being spaced from the end of the pipe. A first such sound pulse, which may be termed an interrogation pulse, indicated by numeral 94 in FIG. 20, traverses the length of the pipe and produces reflected waves such as that indated at 96, at the impedance reflective surface beyond the far end of the pipe. The time for the transducer to ring down or dampen out is indicated at 98. The amplitude of the reflected wave with the greatest peak from the far end of the pipe resulting from the first transmitted pulse is sensed and measured. The gain of the receiver amplifier is then so adjusted, that is, increased, as to make a timer or oscilltor counter stop during the reception of the echo from the second or measuring pulse when approximately 40% of the amplitude of the peak echo of the first pulse is obtained.

Figure 21:
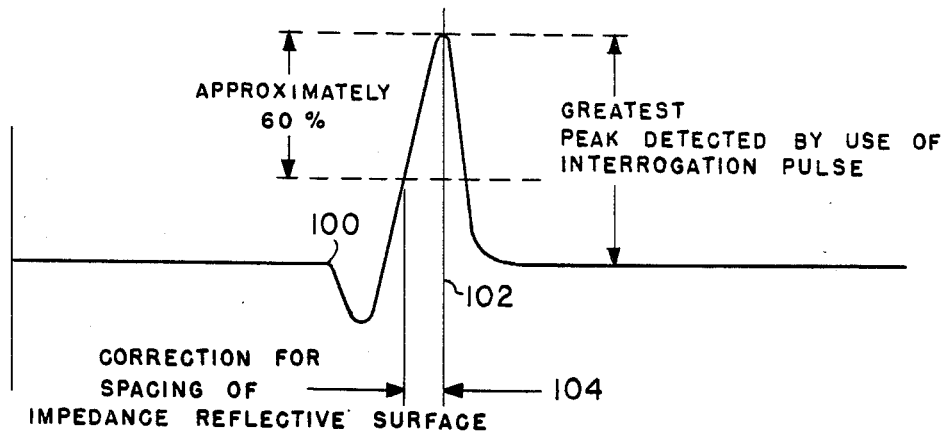
FIG. 21 is a graph providing an echo analysis of the greatest reflected peak detected as a result of an interrogation transmitted pulse.
Figure 22:
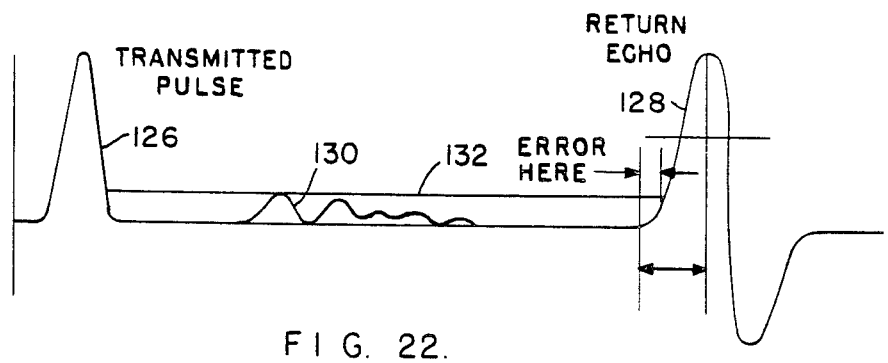
FIG. 22 illustrates graphically in the form of amplitude versus time reflections due to debris in the pipe.

An echo analysis of the greatest reflected peak detected as a result of the interrogation pulse is shown in FIG. 21 wherein the far end of the pipe is indicated at 100 and the maximum spacing of the impedance reflective surface from the far end of the pipe is indicated at 102. The correction effected in accordance with this embodiment of the invention is indicated by the distance 104.

The count of the oscillator counter begins the moment the measurement pulse is transmitted. The count of the oscillator ends when the return echo sensed by the transducer reaches an amplitude that is 40% of the greatest reflected peak that is detected resulting from the transmission of the interrogation pulse. In this way, there is effected an adjustment in the duration of the oscillator count to effect a correction in the pipe length measurement for the distance 104, as seen in FIG. 21, that the impedance reflective surface is spaced from the end of the pipe. Since the distance 104 is a function of the internal diameter of the pipe, the adjustment in the duration of the oscillator count, in this embodiment of the invention, as in the first embodiment, is in accordance with the internal pipe diameter.

It has been found that debris in the pipe will produce echo returns of about 5-25% of the echo from the end of the pipe. The trigger threshold for stopping the timer must be made greater than such "noise" for avoiding response thereto, and consequently, a false measurement.

The transmitted pulses have a duration of from 0.0003 to 0.0012 seconds, the frequency being tuned for maximum conduction in the pipe. As a result, the probe may be directed at the near end of the pipe up to four diameters of the pipe away. and at an angle to the pipe. That is to say, the probe may be positioned with the transducer in spaced open air communication with the interior of the pipe. No acoustic coupling to the pipe to place the probe in closed acoustical communication with the pipe interior is needed.

Figure 19:
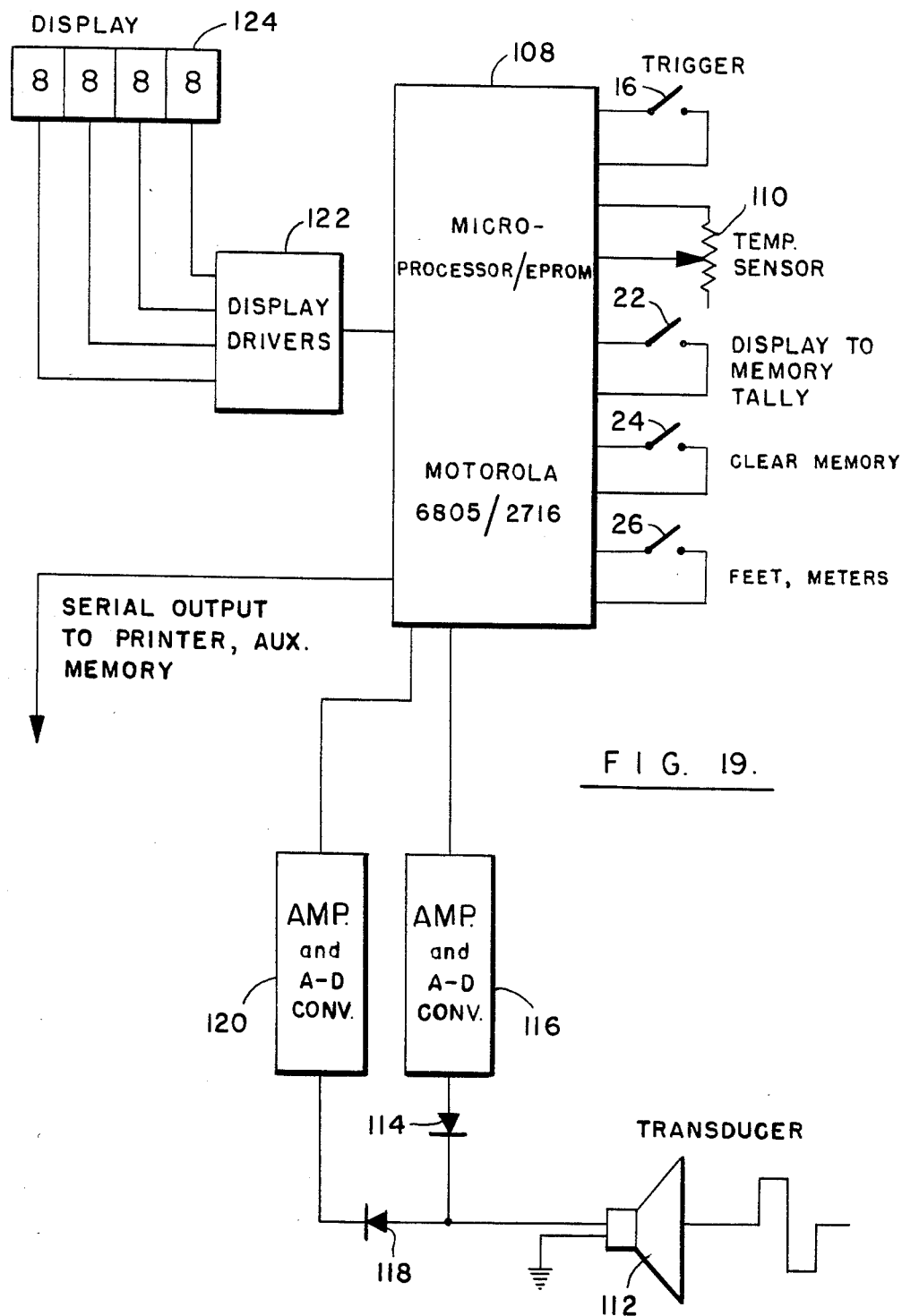
FIG. 19 is a block diagram of a second embodiment of the invention in which a microprocessor is employed for measuring and displaying pipe length.
Figure 20:
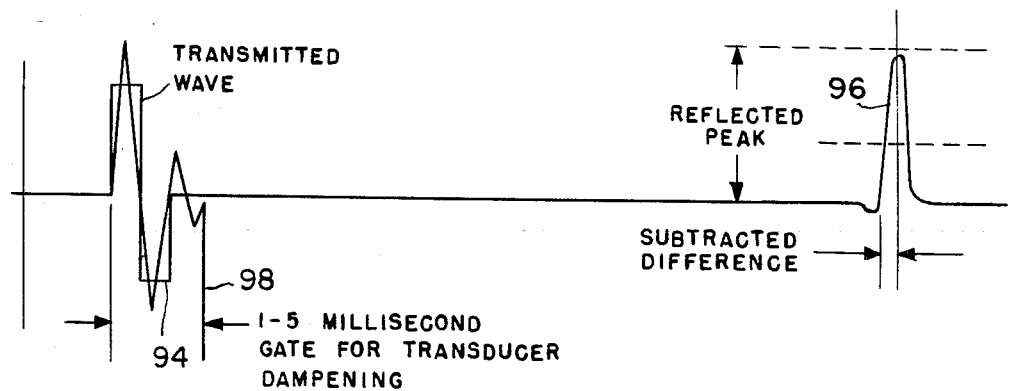
FIG. 20 illustrates graphically in the form of amplitude versus time the transmitted sound pulse, and the reflected pulse at the impedance reflective surface at the far end of the pipe.

Specifically, there is illustrated in FIG. 19 a circuit in block diagram form, employing a microprocessor 108. The microprocessor 108 is connected to receive input data, to process such data in accordance with pre-programmed instructions, and to output the processed data to effect the desired pipe length measurements compensated for air temperature and impedance reflective surface spacing from the far end of the pipe, with the output going to a digital display device and/or to a printer, auxiliary memory, etc.

Connected to the input of the microprocessor circuit 108 are a trigger switch which may be the pistol grip push buttom switch 16 of FIG. 1, a temperature sensitive resistor 110 for ambient temperature compensation, and three additional switches 22, 24 and 26 which may comprise the correspondingly numbered push button switches of FIG. 1, switch 22 directing the display to a memory tally, switch 24 to clear the memory, and switch 26 to direct the output display of measured pipe length in "feet" or "meters." It will be understood that other units of measurement may be employed, if desired.

Also connected to the microprocessor circuit 108 is a transducer, designated 112, that may be similar or identical to the transducer 42 of FIG. 9 and illustrated in FIGS. 10 and 11. This connection includes a first diode rectifier 114 and a first amplifier 116 that are connected in series relation and also a second diode rectifier 118 and a second amplifier 120 that are also connected in series relation, the diode rectifier 114 being connected to conduct in a direction opposite to that of diode rectifier 118. Display drivers 122 and a digital display device 124 are also connected to the microprocessor circuit 108. The display device 124 may be similar, or if desired, identical to the display device 52 of the circuit of FIG. 9.

Similarly to the temperature compensating sensor of FIG. 9, the temperature sensitive resistor 110 of FIG. 19 senses the temperature of the air inside the pipe under measurement and produces a signal in so-called analog form. In the circuit of FIG. 19 that analog signal is converted to digital data form within the microprocessor circuit 108 and is utilized in modifying the response of the transducer 112 and the microprocessor 108 to the reflected acoustic wave from the far end of the pipe under measurement.

In the operation of this embodiment of the invention, it has been found desirable to maintain the microprocessor 108 in a continuously energized state. The electrical current drain of the microprocessor circuit 108 is so small that a single 7.2-volt Nicad battery employed to supply electrical power to the probe 10 can be expected to have an effective life of about two years with the microprocessor 108 continuously energized.

With the microprocessor 108 continuously energized, the following sequence of events occurs when the probe is placed in operative position adjacent the selected end of a pipe the length of which is to be measured, and the push button 16 is closed:

1. The microprocessor 108 is "awakened," senses the air temperature, and determines the units of measurement, that is, feet or meters to be displayed.

2. The microprocessor 108 generates an interrogation pulse that is transmitted by the first diode rectifier 114 and first amplifier 116 as seen in FIG. 19, to activate transducer 112.

3. The microprocessor 108 waits a fixed time of about 0.002 seconds for the ring down time of the transducer 112, and then is ready to accept a signal from the transducer 112, as transmitted by second diode 118 and second amplifier 120.

4. The signal, when received, goes into a peak detector in the microprocessor 108, and the peak detector measures the amplitude of the greatest peak.

5. The microprocessor 108 then sets the threshold of an amplifier in the microprocessor at a level that is approximately forty percent (40%) of the peak amplitude.

6. The microprocessor 108 then sends a second pulse and waits for the reflected pulse. The moment the pulse is sent a clock in the microprocessor begins a count of the cycles of a constant frequency oscillator in the microprocessor 108. That count is stopped immediately upon the return of the reflected wave as sensed by the transducer 112 and transmitted by diode 118 and amplifier 120.

7. Knowing the air temperature and the units of measurement, the microprocessor solves the equation:

$$L = \frac{TV_o}{2}(T_k - 273.5)^{1/2} - 2C(T_k - 273.5)^{-1/2}$$

where $V_o$ is the speed of sound at 273.5° Kelvin at sea level air pressure, $T_k$ is the ambient air temperature, T is the total measured time of the sound pulse through the pipe, and C is above-mentioned constant comprising the sum of "a" and "P". The microprocessor, solving this equation, calculates the length of the pipe and actuates the display drivers 122 and thereby the display device 124. Alternatively, rather than solving the above equation, which involves the taking of square roots, a time consuming operation even for a microprocessor, the pipe length may be determined with significantly less delay by having the microprocessor 108 determine the temperature and humidity and then obtain the value, V, for the speed of sound under the ambient conditions from a table of velocities versus temperature versus humidity, as stored in the memory.

8. The display device 124 remains on until the next measurement is made, or if desired, the microprocessor may be programmed to turn off the display device after a predetermined interval. While in the illustrated form of this embodiment of the invention, two sound pulses are employed in the determination of pipe length, it will be apparent to those skilled in the art that a third and perhaps a fourth successive pulse may be employed in further refining the adjustment in the duration of the count of the oscillator clock and hence, the accuracy of the pipe length measurement.

Within the microprocessor 108, a memory is provided in which is retained an accumulation of the individual readings. By actuating the memory tally switch 22, the operator can effect a readout of the accumulated readings on the display device 124.

Upon actuation of the "clear memory" switch 24, the microprocessor 108 is cleared of all previous accumulated data and information except the programming.

As those skilled in the art understand, in the serial output of the microprocessor 108, each measurement may be recorded, if desired, in an auxiliary memory or printed out on a hard copy printer that may be mounted on the probe 10.

FIGS. 23A-1, 23A-2, 23A-3, 23B-1, 23B-2, and 23B-3 collectively comprise a detailed schematic diagram of the microprocessor circuit of the second embodiment of the invention shown in block diagram form in FIG. 19.

Specifically, the microprocessor 108 is a 6805 chip. The erasable programmable memory (EPROM) in the microprocessor is a type 2716 EPROM. The amplifiers and analog to digital converters 116 and 120 comprise a 4052 chip. The temperature compensating sensor 110 is an LM336 transistor. The display drivers 122 are 4056 liquid crystal display drivers. The interface indicated at 125 is a pin connector. As in the first embodiment of the invention described in connection with FIGS. 9 and 13, the various components comprising the circuitry of FIGS. 23A-1, 23A-2, 23A-3, 23B-1, 23B-2, and 23B-3 may be of commercially available types.

Because of the need for avoiding response to reflections due to debris in the pipe, the trigger threshold has to be made greater than the echo resulting from debris in the pipe. As a result, there tends to remain a small error in the spacing of the impedance reflective surface. This error is illustrated graphically in FIG. 22 wherein the numeral 126 designates a transmitted pulse, the numeral 128 the return echo from the far end of the pipe, and the numeral 130 echoes from debris in the pipe. The numeral 132 indicates the level of response which the trigger threshold must exceed. Because of this, the error indicated at the base of the return echo 128 results.

Figure 24:
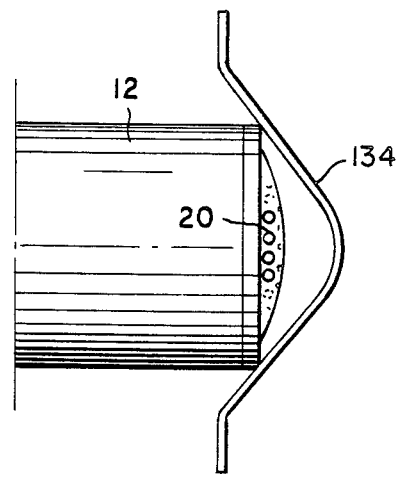
FIG. 24 illustrates a modified shape of the standoff wire for use with the circuitry of FIGS. 19, 23A-1, 23A-2, 23A-3, 23B-1, 23B-2, 23B-3, to compensate for debris in the pipe.

In order to compensate for this error, there may be provided, according the invention, for use with the probe embodying the microprocessor 108 of FIG. 19, a standoff wire frame 134, as illustrated in FIG. 24. The standoff wire frame 134 may be similar to the wire frame described in connection with FIGS. 5-8 and 14-16. As shown in FIG. 24, however, the characteristic shape of the wire frame 134 is different. The optimum characteristic shape of the frame 134 for compensating for the error illustrated in FIG. 22 may be determined experimentally.

Figures 25, 26:
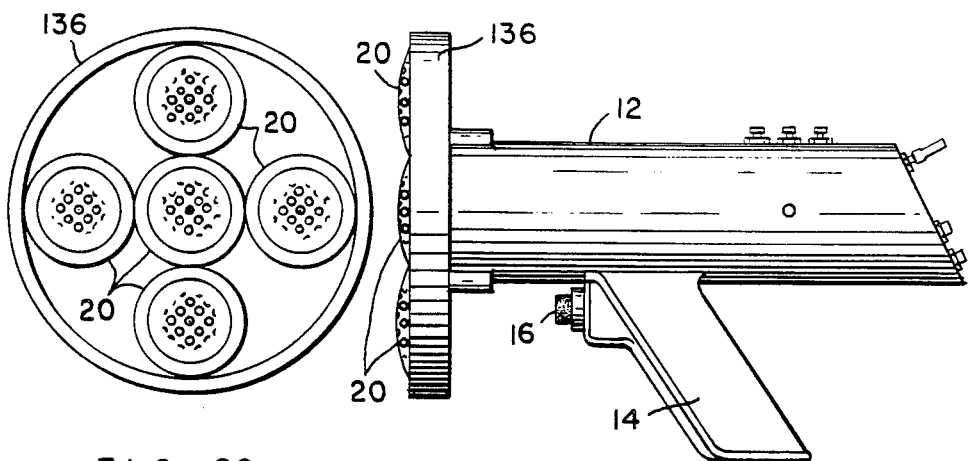
FIGS. 25 and 26 are side elevational and front views, respectively, of a modification of the probe according to the invention for measuring the lengths of large diameter pipes.
Figures 1, 23A:
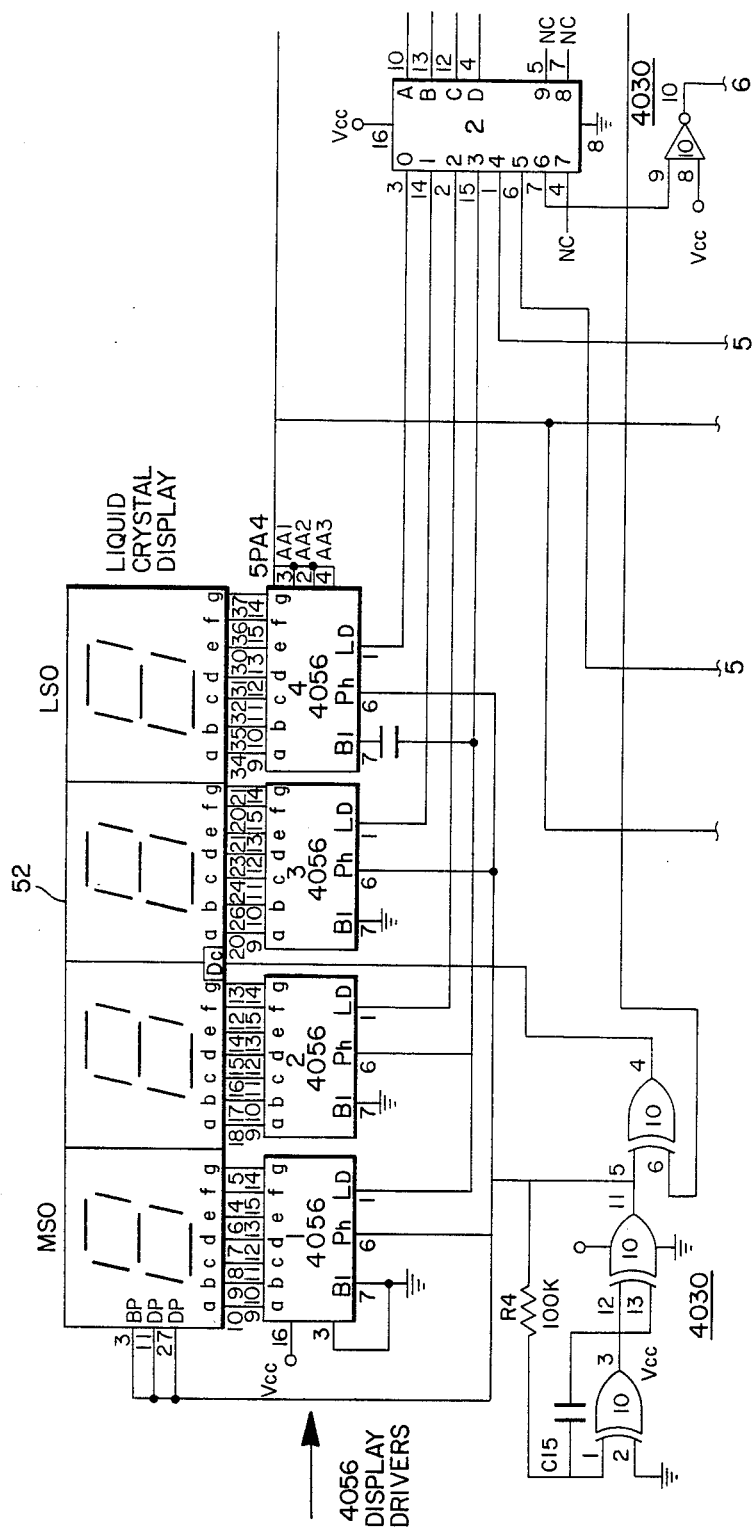
Figures 2, 23A:
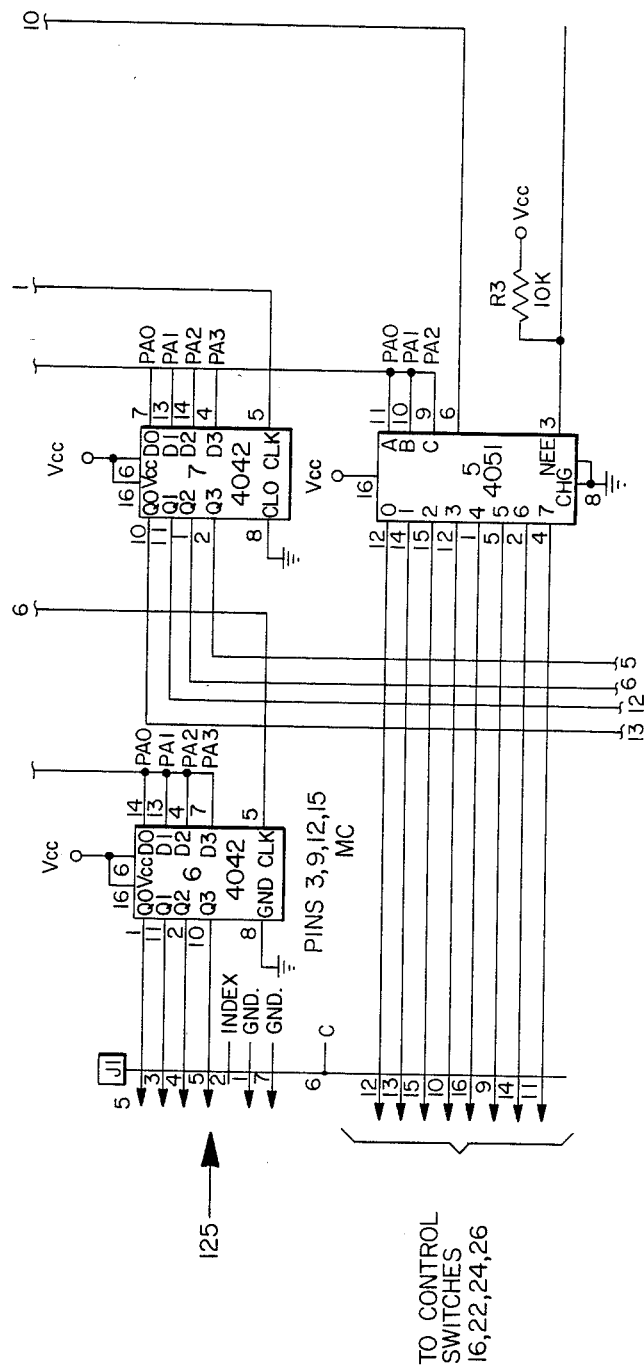
Figures 3, 23A:
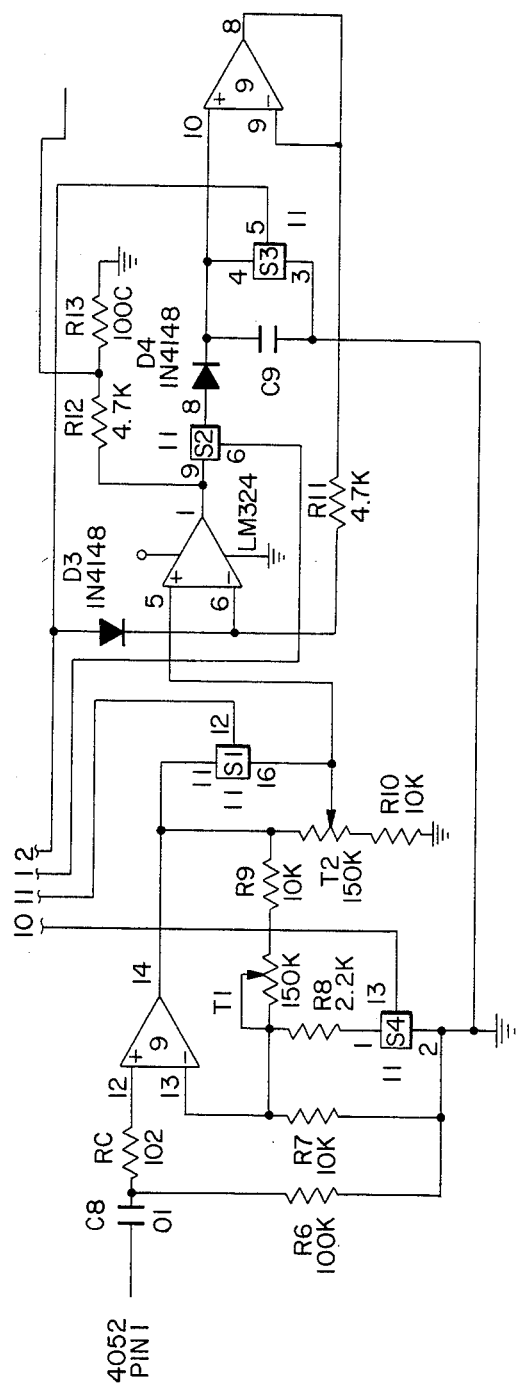
Figure 23:
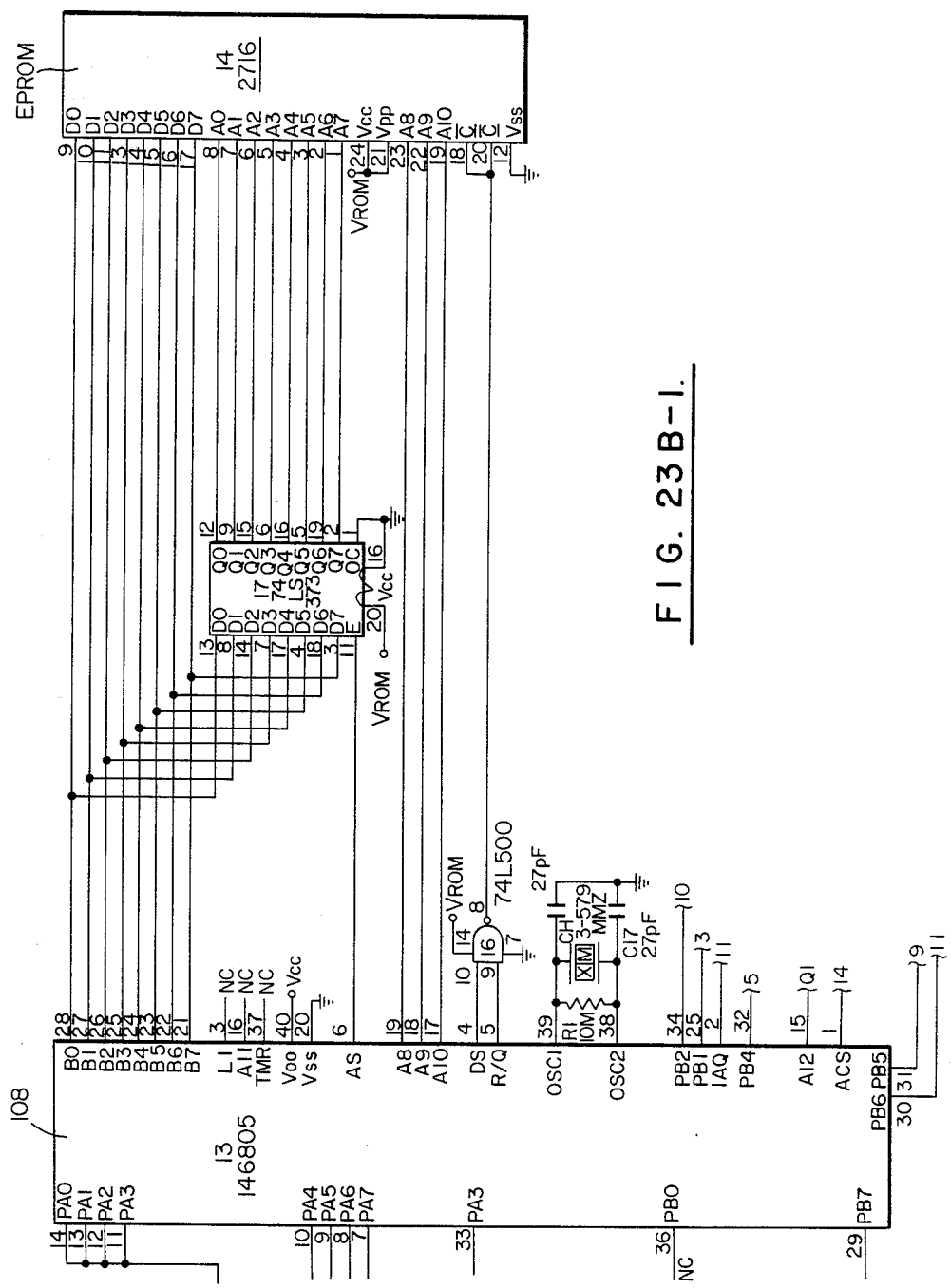
Figures 2, 23B:
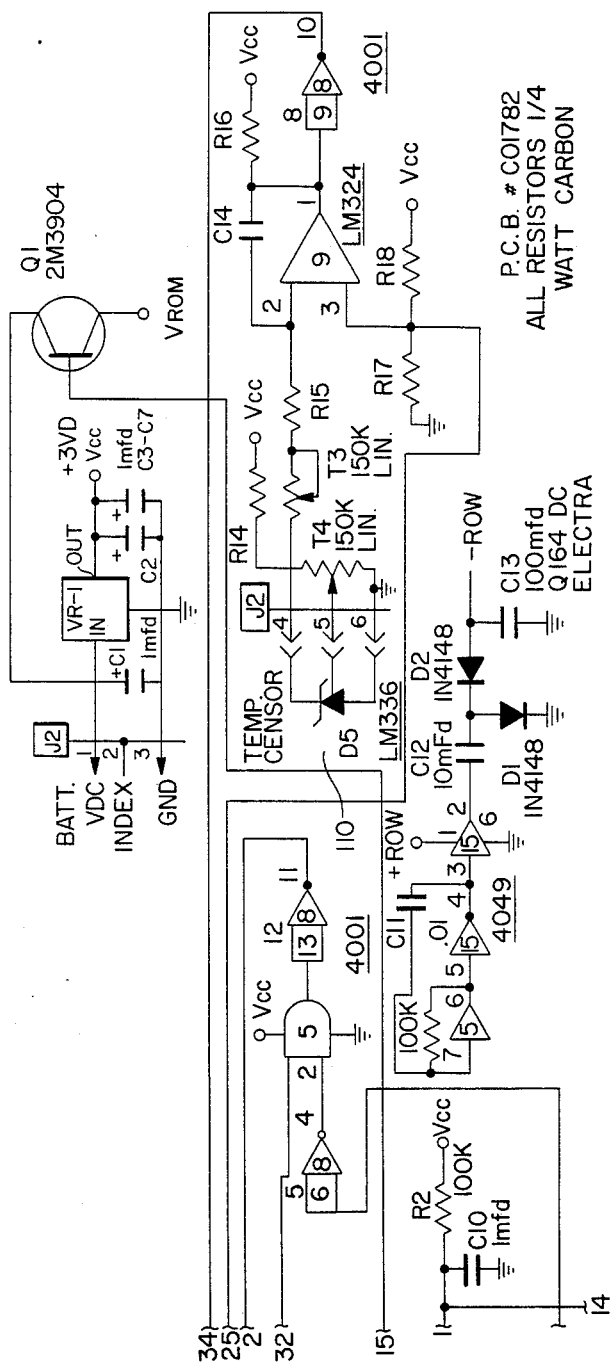
Figures 3, 23B:
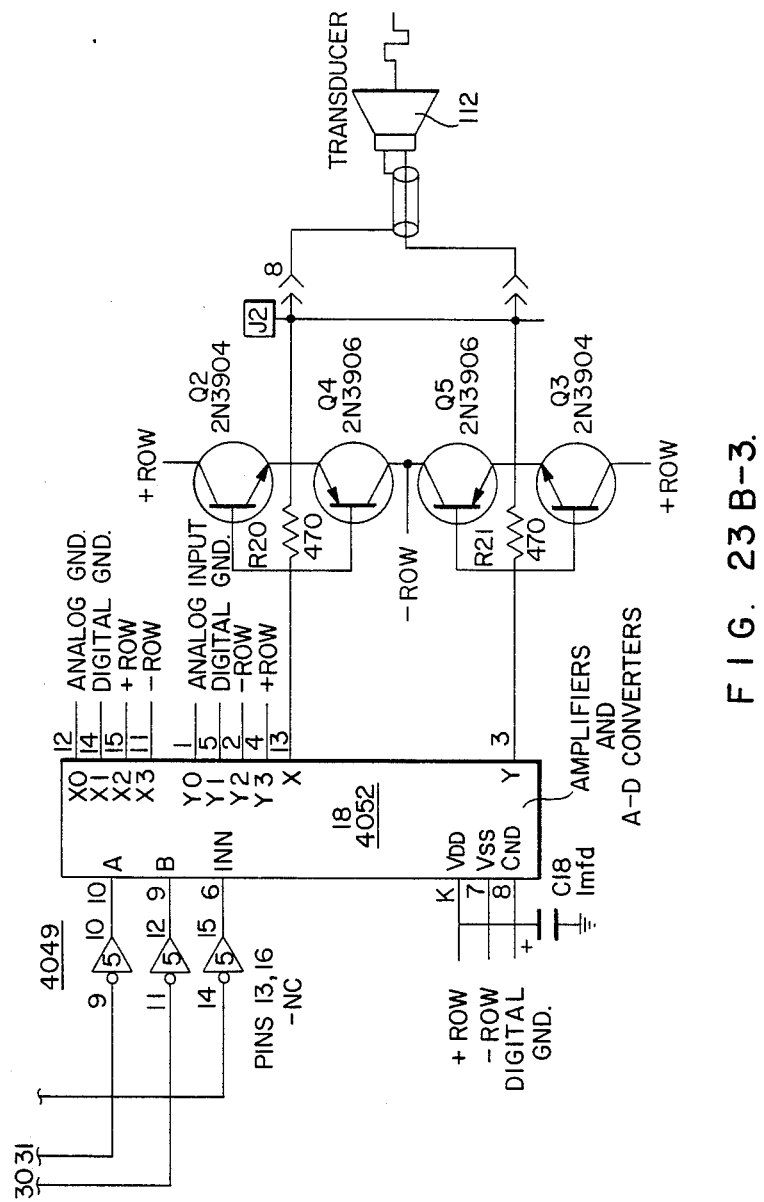

For measuring the lengths of very large diameter pipes, there is provided, as illustrated in FIGS. 25 and 26, an attachment indicated at 136 for the front end of the probe comprising an array of transducers 112, each with its own grille 20 for protection. The attachment 136 desirably is adapted to fit over the front end of the probe and to plug into the curcuitry of FIGS. 19 and 23, the latter being so modified by such attachment as to accommodate the additional transducers 112 of the array in a manner understood by those skilled in the art.

Thus, there has been provided, according to the invention, a method of and apparatus for the measurement of the lengths of pipe having open ends in which compensation is effected for the impedance reflective surface being spaced from the far end of the pipe, in which compensation is not required for the distance the transducer is spaced from the impedance reflective surface, and in which the transducer may be in spaced open air communication with the interior of the pipe at the selected end, closed communication between the transducer and pipe not being required. The apparatus is further characterized in that all of the components required for the pipe length measurements including the power source may be embodied in a light-weight portable probe.

What is claimed is:

1. A method of measuring the length of an open pipe from a selected end of the pipe including the steps of:
   providing sound producing and sound detecting means in spaced open air communication with the interior of the pipe at the selected end,
   causing said sound producing means to produce at least a single sound pulse,
   causing a count of the cycles of a constant frequency oscillator with the production of such sound pulse,
   adjusting the duration of the oscillator count in direct accordance with a valve that, for different pipe diameters over a predetermined range is equal to twice the sum of the distances from the selected end of the pipe to the sound producing and sound detecting means and the other end of the pipe to an adjacent impedance reflective surface,
   detecting with the sound detection means the resulting reflected acoustic wave from the impedance reflective surface adjacent the other end of the pipe, and
   stopping the oscillator count responsively to such detection.

2. A method as specified in claim 1 including the further steps of:
   determining the speed of sound under the ambient conditions,
   adjusting the frequency of operation of the oscillator in accordance with such determination.

3. A method as specified in claim 2 including the further step of visually dispalying the oscillator count in units commonly used for pipe length measurement.

4. A method of measuring the length of an open pipe from a selected end of the pipe having an impedance reflective surface spaced a distance away from the other end of the pipe, including the steps of:
   providing in communication with the air inside the pipe sound producing and sound detecting means,
   spacing the sound producing and sound detecting means a distance from the selected end of said pipe such that, for different pipe diameters over a predetermined range, the sum of that distance and the distance from the other end of the pipe to the adjacent impedance reflective surface is a constant, which for convenience, is designated "C".
   causing the sound producing means to produce a sound pulse,
   beginning a count of cycles of a constant frequency oscillator, upon the production of the sound pusle, after a delay of 2C/V seconds where V is the speed of sound,
   detecting the resulting reflected acoustic wave from the impedance reflective surface adjacent the other end of said pipe, and
   stopping the count of the oscillator responsively to such detection.

5. A method as specified in claim 4 including the further step of:
   measuring the ambient temperature, and adjusting the frequency of operation of the oscillator in accordance with the measured ambient temperature.

6. A method of measuring the length of an open pipe from a selected end of the pipe including the steps of producing and directing into the selected end of the pipe an interrogation acoustical pulse, detecting at the selected end of the pipe the resulting acoustical wave that is reflected from the other end and measuring the amplitude of the greatest peak, producing and directing into the selected end of the pipe a second acoustical pulse having a magnitude that is substantially the same as that of the interrogation pulse, beginning a count of the cycles of a constant frequency oscillator the moment the second acoustical pulse is produced, detecting and measuring the amplitude of the reflected acoustical wave from the other end of the pipe resulting from the second acoustical pulse, and stopping the count of the oscillator when the amplitude of the reflected acoustical wave is substantially less than the amplitude of the greatest peak.

7. A method as specified in claim 6 wherein the amplitude of the reflected acoustical wave resulting from the second pulse at which the count of the oscillator is stopped is above the threshold of reflected acoustical waves tending to be caused by debris in the pipe.

8. A method as specified in claim 6 wherein the count of the oscillator is stopped when the amplitude of the reflected acoustical wave resulting from the second pulse is approximately forty percent (40%) of the greatest peak.

9. A method as specified in claim 7 including the further steps of:

measuring the ambient temperature, and
adjusting the final count of the oscillator in accordance with the measured ambient temperature.

10. A hand-held probe for measuring the length of an open pipe from a selected end, said probe having a forward face in spaced open air communication with the interior of the pipe at the selected end, comprising, a transducer comprising a sound generator and a sound detector mounted in said probe adjacent the forward face of the probe,
a constant frequency oscillator,
means for causing said transducer to produce at least a single sound pulse,
means for causing the beginning of a count of the cycles of said constant frequency oscillator with the production of such sound pulse,
means for modifying the duration of the oscillator count in accordance with a value that, for different pipe diameters over a predetermined range, is equal to twice the sum of the distances from the selected end of the pipe to an adjacent transducer and the other end of the pipe to an adjacent impedance reflective surface,
means including said transducer for detecting the resulting reflected acoustic wave from the impedance reflective surface adjacent the other end of the pipe, and
means for stopping the count of said oscillator responsively to such detection.

11. A hand-held probe as specified in claim 10 further including means for determining the speed of sound under the ambient conditions, and means for adjusting the frequency of operation of said oscillator in accordance with such determination.

12. A hand-held probe as specified in claim 11 further including means connected to said oscillator for visually displaying the oscillator count in units commonly used for pipe length measurement, 13. A hand-held acoustical probe for measuring the length of a pipe from a selected end including mechanical means for positioning said probe in spaced open air communication with the interior of the pipe at the selected end, the shape of said means being such that the distance the probe is spaced from the selected end varies inversely with the pipe internal diameter, wherein said probe comprises an elongated structure and includes an acoustical transducer adjacent a first end thereof, and wherein said mechanical means is attached to said first end, said mechanical means comprising a triangular wire frame the apex of which is positioned forwardly of said first end.

14. A hand-held probe as specified in claim 13 wherein the angle of said triangular wire frame at the apex thereof is in a range of 96° to 136°.

15. A hand-held probe as specified in claim 13 further including a cylindrical tube that is symmetrically attached at one end to said triangular wire frame between the apex thereof and said first end of said probe.

16. A hand-held probe as specified in claim 13 further including a pistol grip handle positioned intermediate said first end of said probe and the other end thereof, said handle including a push button switch for initiating operation of said probe, and further including a display device at the other end for visually displaying pipe length measurements.

17. A hand-held probe as specificed in claim 13 including an ambient temperature compensating resistor mounted on said triangular wire frame at the inside of the bend at the apex thereof.

18. A hand-held probe for measuring the length of an open pipe from a selected end, said probe having a forward face in spaced open air acoustical communication with the interior of the pipe at the selected end, comprising, a transducer comprising a sound generator and a sound detector mounted in said probe adjacent said forward face,
a pulse generator,
a flip flop,
a constant frequency oscillator,
an amplifier,
a display unit,
a power source,
a switch,
means controlled by the switch for connecting said power source to activate said pulse generator and said oscillator, said pulse generator when activated producing a pulse, and said oscillator when activated beginning a count,
means connecting said pulse generator to said flip flop,
means connecting said flip flop to said sound generator whereby the pulse produced by said pulse generator is transmitted through said flip flop to activate said sound generator to produce a sound pulse,
acoustical reflection from an impedance reflective surface adjacent the far end of the pipe resulting from the pulse produced by said sound generator being detected by said sound detector, a connection from said sound detector to said flip flop, a connection from said flip flop to said amplifier, a connection from said amplifier to said oscillator, and a connection from said oscillator to said display unit, a signal generated by said sound detector upon detection of said resulting acoustical reflection being transmitted by said flip flop and said amplifier to disable said oscillator to stop the counting.

19. A hand-held probe as specified in claim 18 including an ambient temperature sensor to sense the temperature of the air in the region of the selected end of the pipe, and further including means connected to said sensor for adjusting the frequency of operation of said oscillator to compensate for variations in the ambient air temperature.

20. A hand-held probe as specified in claim 19 further including a display device, and a connection from said oscillator to said display device for displaying the count of said oscillator, said display device being mounted on a rear face of said probe.

21. A hand-held probe as specified in claim 20 wherein said flip flop, following the production of a pulse by said sound generator, introduces a delay of predetermined duration before accepting a signal from said sound detector and transmitting such signal to said amplifier and said oscillator to allow for dampening of said sound generator.

22. A hand-held probe, as specified in claim 21 wherein said sound generator and said sound detector of said transducer are constituted by a single device, said single device comprising a diaphragm having a piezoelectric element attached substantially at the center thereof with a reaction mass attached to the piezoelectric element.

23. A hand-held probe for measuring the length of an open pipe from a selected end, said probe having a forward face in spaced open air communication with the interior of the pipe at the selected end, comprising, a transducer comprising a sound generator and a sound detector mounted in said probe adjacent said forward face, a pulse generator, a flip flop, a constant frequency oscillator, a delay device, an amplifier, a display unit, a power source, a switch, means controlled by the switch for connecting said power source to activate the pulse generator and the delay unit, the pulse generator when activated producing a pulse, means connecting said pulse generator to said flip flop, means connecting said flip flop to said sound generator whereby the pulse produced by said pulse generator is transmitted through said flip flop to activate said sound generator to produce a sound pulse, means for positioning the forward face of said probe with repsect to the selected end of the pipe such that the sum of the distance thereof to the selected end of the pipe and the distance of the far end of the pipe to an impedance reflective surface is a constant, for convenience, designated "C", a connection from said delay device to said oscillator whereby the delay device, following connection of the power source thereto by said switch and after a delay of 2C/V seconds, where V is the speed of sound, activates said oscillator to begin a count, acoustical reflection from the impedance reflective surface resulting from the pulse produced by said sound generator being detected by said sound detector, a connection from said sound detector to said flip flop, a connection from said flip flop to said amplifier, a connection from said amplifier to said oscillator, and a connection from said oscillator to said display unit, a signal generated by said sound detector upon detection of said resulting acoustical reflection being transmitted by said flip flop and said amplifier to disable oscillator to stop the counting.

24. A hand-held probe as specified in claim 23 including an ambient temperature sensor to sense the temperature of the air in the region of the selected end of the pipe, and further including means connected to said sensor for adjusting the frequency of said oscillator to compensate for variations in the ambient air temperature.

25. A hand-held probe as specified in claim 24 further including a display device, and a connection from said oscillator to said display device for displaying the count of said oscillator, said display device being mounted on a rear face of said probe.

26. A hand-held probe as specified in claim 25 wherein said flip flop, following the production of a pulse by said sound generator, introduces a delay of predetermined duration before accepting a signal from said sound detector and transmitting such signal to said amplifier and said oscillator to allow for dampening of said sound generator.

27. A hand-held probe, as specified in claim 26, wherein said sound generator and said sound detector of said transducer are constituted by a single device, said single device comprising a diaphragm having a piezoelectric element attached substantially at the center thereof with a reaction mass attached to the piezoelectric element.

28. A hand held probe, as specified in claim 27, wherein said diaphragm is flat.

29. A hand-held probe, as specified in claim 25 wherein said oscillator includes a resistor-capacitor circuit, and wherein said probe further includes a plurality of resistors each having a different value, and switch means for selectively connecting said resistors in circuit with said resistor-capacitor circuit to vary the frequency of operation of said oscillator whereby to adjust the units of measurement.

30. A hand-held probe for measuring the length of an open pipe from a selected end, said probe having a forward face that when in pipe length measuring position is in spaced open air communication with the interior of the pipe at the selected end thereof, a transducer mounted adjacent the forward face of the probe and operative when activated to produce and direct an acoustical pulse into the interior of the pipe, said transducer including means for detecting reflected acoustical waves emanating from the interior of the pipe, a microprocessor including a programmed memory, a pulse generator, and a constant frequency clock oscillator, means including amplifying means connecting said microprocessor to said transducer, the threshold level of response of said amplifying means being adjustable, switch means to activate said microprocessor, said microprocessor, when activated, operating responsively to said memory to carry out a sequence of operations including:

activating said pulse generator to produce a first electrical pulse and thereby through said amplifying means causing said transducer to produce a first acoustical pulse, responding to and measuring through said transducer and said amplifying means the amplitude of the greatest peak of the reflected wave resulting from the first acoustical pulse, adjusting the threshold of response of said amplifying means to an acoustical level that is substantially less than said greatest peak, activating said pulse generator to produce a second electrical pulse and thereby through said amplifying means causing said transducer to produce a second acoustical pulse, simultaneously causing a count to begin of the cycles of said constant frequency clock oscillator, and stopping said count responsively to the detection by said transducer, through said amplifying means, of a reflected acoustical wave having an amplitude exceeding said threshold.

31. A hand-held probe as specified in claim 30 including temperature responsive means positioned on the probe to respond to the temperature of the ambient air adjacent the selected end of the pipe, said memory being operative upon activation of said switch means to effect an adjustment in the frequency of operation of said constant frequency oscillator to compensate for variations in the ambient air temperature.

32. A hand-held probe as specified in claim 31 further including display means and display driving means connected thereto, and means connecting said display driving means to said microprocessor for activating said display means in accordance with the count of said constant frequency clock oscillator.

33. A hand-held probe as specified in claim 32 further including a standoff frame associated with the forward face of said probe to space said forward face a distance from the selected end of the pipe that is in inverse relationship with the diameter of the pipe.

34. A hand-held probe as specified in claim 30 wherein said memory has stored therein a table of sound velocity versus ambient air conditions, and further including means responsive to the condition of the ambient air adjacent the selected end of the pipe, said last mentioned means having a connection to said microprocessor whereby said microprocessor is enabled to determine the speed of sound at the ambient condition from the table and to effect a compensating adjustment to the pipe length measurement.

* * * * *